US011908608B2

(12) United States Patent
Maki

(10) Patent No.: US 11,908,608 B2
(45) Date of Patent: Feb. 20, 2024

(54) COIL COMPONENT

(71) Applicant: Murata Manufacturing Co., Ltd., Kyoto-fu (JP)

(72) Inventor: Kenichiro Maki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 418 days.

(21) Appl. No.: 17/117,070

(22) Filed: Dec. 9, 2020

(65) Prior Publication Data

US 2021/0183563 A1 Jun. 17, 2021

(30) Foreign Application Priority Data

Dec. 11, 2019 (JP) ................................ 2019-223502

(51) Int. Cl.

*H01F 27/06* (2006.01)
*H01F 27/28* (2006.01)
*H01F 27/24* (2006.01)
*H01F 41/04* (2006.01)
*H01F 17/04* (2006.01)
*H01F 17/00* (2006.01)

(52) U.S. Cl.

CPC ......... *H01F 27/2823* (2013.01); *H01F 17/04* (2013.01); *H01F 27/06* (2013.01); *H01F 27/24* (2013.01); *H01F 41/04* (2013.01); *H01F 2017/0093* (2013.01)

(58) Field of Classification Search

CPC ...... H01F 27/2823; H01F 17/04; H01F 27/06; H01F 27/24; H01F 41/04; H01F 2017/0093; H01F 27/263; H01F 27/2847; H01F 27/306; H01F 27/324; H01F 37/00; H01F 5/02; H01F 5/06; H01F 27/266; H01F 27/30; H01F 27/303; H01F 27/32; H01F 27/325

See application file for complete search history.

(56) References Cited

U.S. PATENT DOCUMENTS 2,494,350 A * 1/1950 Mittermaier .......... H01F 27/263
336/65
4,837,543 A * 6/1989 Humen .................. H01F 27/02
336/92

(Continued)

FOREIGN PATENT DOCUMENTS

JP H05-36822 A 2/1993
JP H06-295834 A 10/1994

(Continued)

*Primary Examiner* — Mang Tin Bik Lian
(74) *Attorney, Agent, or Firm* — Studebaker & Brackett PC

(57) ABSTRACT

A coil component includes a frame-shaped magnetic core including wound sections facing each other, cylindrical coil conductors, and a holder made of an insulating material and holding the coil conductors and the magnetic core. The magnetic core extends through the coil conductors such that the coil conductors and the wound sections are associated with each other. The holder includes a first partition disposed between the magnetic core and a first winding wire end of each of the coil conductors, a second partition disposed between the magnetic core and a second winding wire end of each of the coil conductors, and a third partition disposed between the coil conductors. The first to third partitions are integrally formed.

19 Claims, 13 Drawing Sheets

(56) References Cited

U.S. PATENT DOCUMENTS

| | | | | |
|---|---|---|---|---|
| 5,619,176 | A * | 4/1997 | Hays | H01F 29/025 336/192 |
| 6,414,291 | B1 * | 7/2002 | Kim | H01F 41/125 336/183 |
| 8,896,404 | B2 * | 11/2014 | Won | H01F 41/08 336/182 |
| 2004/0041676 | A1 * | 3/2004 | Okamoto | H01F 27/027 336/90 |
| 2004/0169567 | A1 * | 9/2004 | Okamoto | H01F 27/266 333/181 |
| 2009/0184792 | A1 * | 7/2009 | Yang | H01F 37/00 336/65 |
| 2018/0061557 | A1 * | 3/2018 | Yang | H01F 27/289 |
| 2019/0006079 | A1 * | 1/2019 | Itaya | H01F 27/325 |
| 2020/0035398 | A1 * | 1/2020 | Hirabayashi | H01F 27/263 |
| 2020/0203052 | A1 * | 6/2020 | Murakami | H01F 27/2828 |

FOREIGN PATENT DOCUMENTS

| | | | |
|---|---|---|---|
| JP | H08-298217 | A | 11/1996 |
| JP | 2004-165256 | A | 6/2004 |
| JP | 2008-227019 | A | 9/2008 |
| JP | 2009-123825 | A | 6/2009 |
| JP | 2018-186243 | A | 11/2018 |

* cited by examiner

COIL COMPONENT

CROSS-REFERENCE TO RELATED APPLICATION

This application claims benefit of priority to Japanese Patent Application No. 2019-223502, filed Dec. 11, 2019, the entire contents of which is incorporated herein by reference.

BACKGROUND

Technical Field

The present disclosure relates to coil components and more specifically to a coil component, such as a common-mode choke coil, in which a holder holds a pair of coil conductors cylindrically wound and a frame-shaped magnetic core extending through the coil conductors.

Background Art

In recent years, small coil components, such as common-mode choke coils, in power supply circuits in electric vehicles or the like have been used to reduce noise arising from switching in the circuits.

For such coil components, a technique of housing a coil conductor and a magnetic core in a casing made of an insulating material has been known.

One example coil component proposed in Japanese Unexamined Patent Application Publication No. 2009-123825 (see, for example, pars. [0019] to [0028] and FIG. 4), which is illustrated in FIG. 21. FIG. 22 is an enlarged cross-sectional view of an "a" section in FIG. 21.

In the coil component in Japanese Unexamined Patent Application Publication No. 2009-123825, a pair of coil conductors and a pair of magnetic cores (not illustrated) are housed in a coil casing 103 including a first casing member 101 and a second casing member 102. The first casing member 101 includes a base plate section 104, a first barrier plate section 105, a partition barrier plate section 106, and side plate sections 107*a* and 107*b*, and those elements are integrally formed of an insulating material. The first barrier plate section 105 has bobbin insertion holes 105*a* and 105*b* in predetermined positions. The second casing member 102 includes a second barrier plate section 108 and a pair of coil bobbin sections 109*a* and 109*b*, and those elements are integrally formed of an insulating material. The second barrier plate section 108 has a partition insertion hole 110 for fitting a leading end of the partition barrier plate section 106 therein, as illustrated in FIG. 22.

The coil component in Japanese Unexamined Patent Application Publication No. 2009-123825 is assembled in the following way. That is, after the pair of coil conductors are arranged in predetermined positions in space defined by the base plate section 104 and the side plate sections 107*a* and 107*b*, the second casing member 102 is mounted to the first casing member 101 while the coil bobbin sections 109*a* and 109*b* are inserted into the coil conductors and the bobbin insertion holes 105*a* and 105*b* and the leading end of the partition barrier plate section 106 is inserted into the partition insertion hole 110. Of the pair of magnetic cores, one magnetic core is inserted into the coil bobbin sections 109*a* and 109*b* from the side on which the first barrier plate section 105 in the first casing member 101 is positioned, the other magnetic core is inserted into the coil bobbin sections 109*a* and 109*b* from the side on which the second barrier plate section 108 in the second casing member 102 is positioned, the pair of magnetic cores are coupled together and form a closed magnetic circuit, and the coil component is obtained.

In recent years, a driving voltage for a power supply circuit in an electric vehicle or the like has tended to increase, and there have been demands that a coil component used therein have satisfactory withstand voltage performance and be miniaturized.

In the coil component in Japanese Unexamined Patent Application Publication No. 2009-123825, however, as illustrated in FIG. 22 described above, because the partition barrier plate section 106 for separating the coil conductors is inserted into the partition insertion hole 110, a gap t is inevitably present between the partition insertion hole 110 and the partition barrier plate section 106. That is, for the coil component in Japanese Unexamined Patent Application Publication No. 2009-123825, because of the gap t between the partition insertion hole 110 and the partition barrier plate section 106, the insulation between the coil conductors may be inadequate, and its withstand voltage performance may be insufficient.

SUMMARY

Accordingly, the present disclosure provides a coil component, such as a common-mode choke coil, being small, capable of ensuring sufficient insulation, and having satisfactory withstand voltage performance.

According to preferred embodiments of the present disclosure, a coil component includes a frame-shaped magnetic core including wound sections facing each other, a pair of coil conductors in which a wire is cylindrically wound, and a holder made of an insulating material and surrounding and holding the pair of coil conductors and the magnetic core. The magnetic core extends through the coil conductors such that the coil conductors and the wound sections are associated with each other. The holder includes a first partition disposed between the magnetic core and a first winding wire end of each of the coil conductors, a second partition disposed between the magnetic core and a second winding wire end of each of the coil conductors, and a third partition disposed between the pair of coil conductors. The first partition, the second partition, and the third partition are integrally formed.

Because the first partition, the second partition, and the third partition are integrally formed, no gaps are present between the first to third partitions, and the coil component that can ensure sufficient insulation and that has satisfactory withstand voltage performance is obtainable.

According to preferred embodiments of the present disclosure, the magnetic core in the coil component may preferably is separable into a first magnetic core and a second magnetic core, the first partition may preferably be disposed between the first magnetic core and each of the first winding wire ends, and the second partition may preferably be disposed between the second magnetic core and each of the second winding wire ends.

After the pair of coils are set to the first to third integrally formed partitions, the first magnetic core and the second magnetic core are set, and therefore, sufficient electrical insulation is provided between the magnetic core and each of the first and second coil conductors and between the first coil conductor and the second coil conductor. Thus, the coil component that can ensure sufficient insulation and that has satisfactory withstand voltage performance and a closed magnetic circuit configuration is easily obtainable.

According to preferred embodiments of the present disclosure, the wire in the coil component may preferably be a rectangular wire.

Because the space factor in the case of the rectangular wire can be larger than that in the case of a round wire, the rated current can be increased, and the high-performance coil component is obtainable.

According to preferred embodiments of the present disclosure, the magnetic core in the coil component may preferably be fixed by a fastening unit made of a metallic material.

According to preferred embodiments of the present disclosure, the fastening unit in the coil component may preferably include a terminal section, and the terminal section may preferably be arranged in a position opposed to a mounting substrate. The terminal section may preferably be coated with plating.

The terminal section in the fastening unit can be bonded directly to the mounting substrate with soldering or the like interposed therebetween, the strength of adhesion between the mounting substrate and the coil component can be easily enhanced, and the coil component with satisfactory substrate mountability is obtainable.

According to preferred embodiments of the present disclosure, the coil conductors in the coil component may preferably be of a transversely wound type or a longitudinally wound type.

When the coil conductors of the transversely wound type or the longitudinally wound type is used, the coil component with satisfactory insulation and satisfactory withstand voltage performance is obtainable.

According to preferred embodiments of the present disclosure, the holder in the coil component may preferably be placed on a support.

Even when the coil component is of the longitudinally wound type, because the holder holding the magnetic core and the coil conductors is disposed on the support, like the transversely wound type, the coil component that can ensure sufficient insulation and that has satisfactory withstand voltage performance is obtainable.

According to preferred embodiments of the present disclosure, the magnetic core in the coil component may preferably be made of a ferrite-based material.

According to preferred embodiments of the present disclosure, the coil component may preferably be a common-mode choke coil.

Even when being used in a power supply line, the common-mode choke coil having satisfactory insulation, having satisfactory withstand voltage performance, and being useful as a noise reduction filter is obtainable.

According to the coil component in preferred embodiments of the present disclosure, no gaps are present between the first to third partitions, and the small coil component that can ensure sufficient insulation and that has satisfactory withstand voltage performance is obtainable.

Other features, elements, characteristics and advantages of the present disclosure will become more apparent from the following detailed description of preferred embodiments of the present disclosure with reference to the attached drawings.

DETAILED DESCRIPTION

Embodiments of the present disclosure are described below.

First Embodiment

Figure 1:
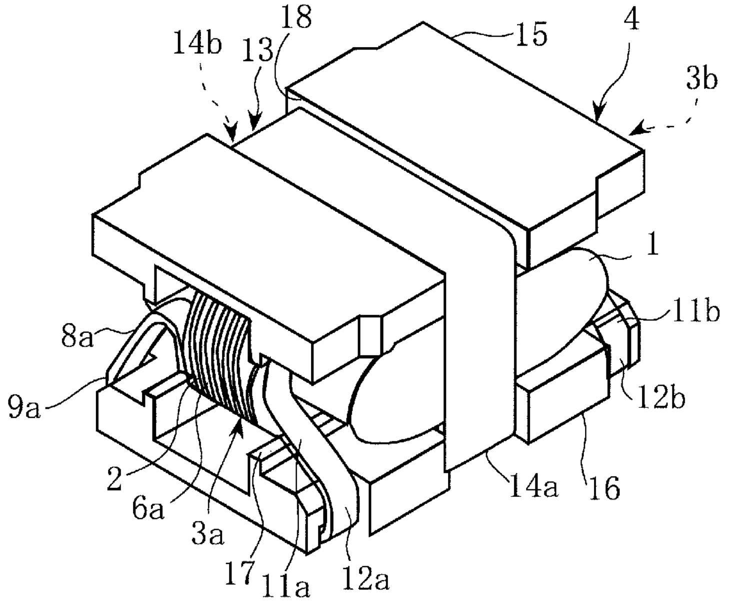
FIG. 1 is an overall perspective view that schematically illustrates one embodiment (first embodiment) of a common-mode choke coil as a coil component according to the present disclosure.
Figure 2:
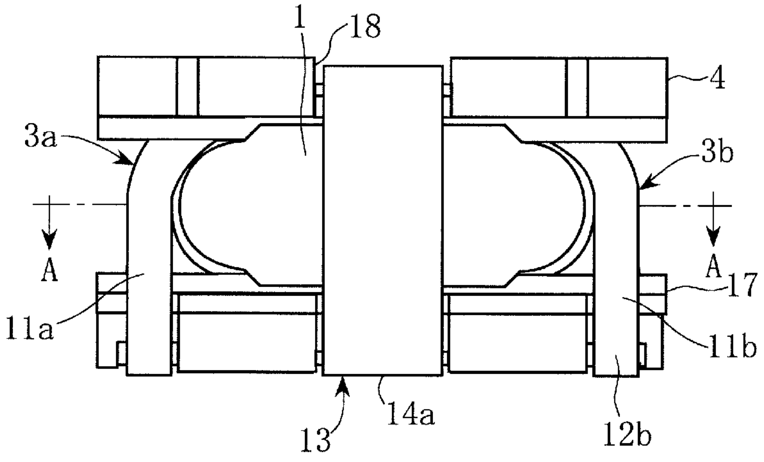
FIG. 2 is a front view of the first embodiment.

FIG. 1 is an overall perspective view that schematically illustrates one embodiment (first embodiment) of a common-mode choke coil as a coil component according to the present disclosure, and FIG. 2 is a front view thereof.

The common-mode choke coil includes a frame-shaped magnetic core 1 made of a ferrite material, a pair of coil conductors (first coil conductor 3*a* and second coil conductor 3*b*) in which a wire 2 is cylindrically wound, and a holder 4 made of an insulating material and surrounding and holding the first and second coil conductors 3*a* and 3*b* and the magnetic core 1.

In the first embodiment, the first and second coil conductors 3*a* and 3*b* are of the transversely wound type in which their winding axes are substantially in parallel with a horizontal plane.

Figure 3:
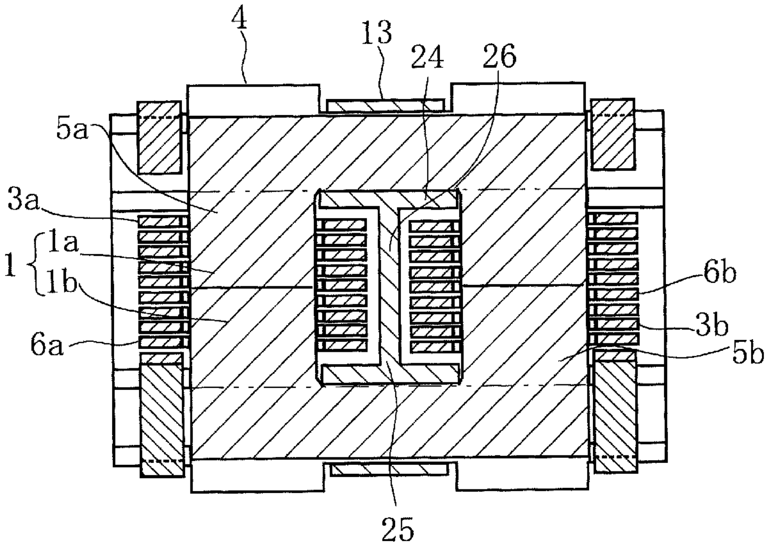
FIG. 3 is a cross-sectional view in the direction of the arrows A in FIG. 2.

FIG. 3 is a cross-sectional view in the direction of the arrows A in FIG. 2.

That is, the magnetic core 1 is separated into a first magnetic core 1*a* and a second magnetic core 1*b*. The first magnetic core 1*a* and the second magnetic core 1*b* are coupled together and form the frame-shaped magnetic core 1.

Specifically, the magnetic core 1 includes a pair of wound sections (first wound section 5*a* and second wound section 5*b*) facing each other. The first and second wound sections 5*a* and 5*b* in the magnetic core 1 extend through the first and second coil conductors 3*a* and 3*b*, respectively, such that the first coil conductor 3*a* and the first wound section 5*a* are associated with each other and the second coil conductor 3*b* and the second wound section 5*b* are associated with each other.

The ferrite material of the magnetic core 1 is not limited, and various ferrite materials can be used. Examples thereof may include Ni-based, Cu—Zn-based, Ni—Zn-based, Mn—Zn-based, and Ni—Cu—Zn-based ferrite materials.

The holder 4 includes first to third partitions 24 to 26. Those first to third partitions 24 to 26 are integrally formed, and thus sufficient electrical insulation is provided between the magnetic core 1 and the first and second coil conductors 3*a* and 3*b* and desired withstand voltage performance is ensured. Specifically, the first to third partitions 24 to 26 are integrally formed by shape processing, such as injection molding, so as to have a substantially I-shaped cross section at the time of producing the holder 4. That is, the first partition 24 is disposed between the first magnetic core 1*a* and each of the first and second coil conductors 3*a* and 3*b*, the second partition 25 is disposed between the second magnetic core 1*b* and each of the first and second coil conductors 3*a* and 3*b*, and the third partition 26 is disposed between the first coil conductor 3*a* and the second coil conductor 3*b*.

Figure 4:
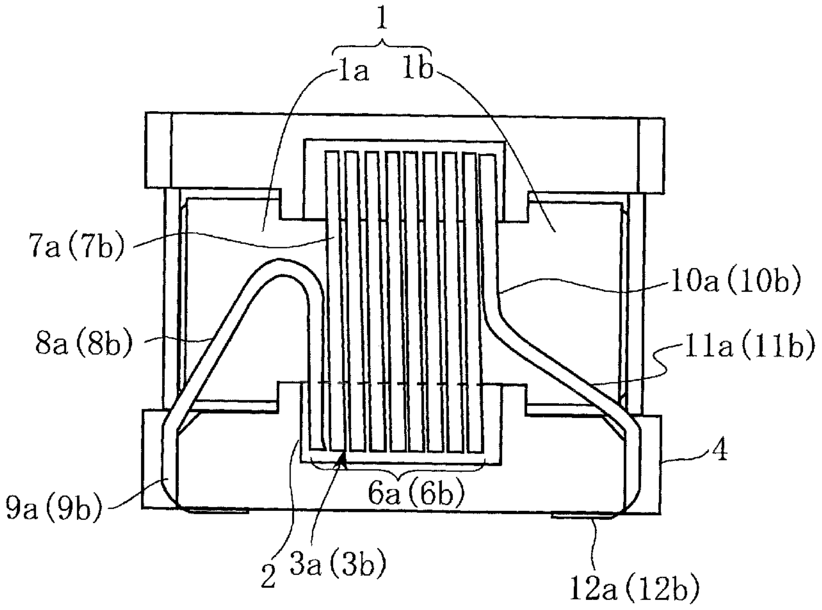
FIG. 4 is a side view of FIG. 2.

FIG. 4 is a side view of the common-mode choke coil and illustrates the details of the coil conductors.

In the first embodiment, the wire 2 is a coated rectangular wire. The coated rectangular wire is the one in which the core is made of a metal material, such as copper, aluminum, or an alloy of them, and is coated with an enamel material, such as polyamide-imide. When the coated rectangular wire is used as the wire 2, the space factor can be increased, and the rated current can be raised, in comparison with the case where a coated round wire is used. Thus, the high-performance small common-mode choke coil is obtainable.

The first coil conductor 3*a* and the second coil conductor 3*b* have the same shape, and in the first embodiment, they are edgewise wound coils in which a flat coated rectangular wire is bent in the width direction and wound.

The first and second coil conductors 3*a* and 3*b* include winding sections 6*a* and 6*b* in which the wire 2 is cylindrically wound, as illustrated in FIG. 4. The winding sections 6*a* and 6*b* have first winding wire ends 7*a* and 7*b* bent into an approximately U shape and forming inclined sections 8*a* and 8*b*. The distal ends of the inclined sections 8*a* and 8*b* are bent into an approximately L shape toward the winding sections 6*a* and 6*b* so as to be able to engage with the holder 4 and thus form first extended sections 9*a* and 9*b*. The winding sections 6*a* and 6*b* has second winding wire ends 10*a* and 10*b* extending downward and having distal ends curved into an approximately V shape and forming inclined sections 11*a* and 11*b*. The distal ends of the inclined sections 11*a* and 11*b* are bent into an approximately L shape toward the winding sections 6*a* and 6*b*, that is, in positions facing the first extended sections 9*a* and 9*b* so as to be able to engage with the holder 4 and thus form second extended sections 12*a* and 12*b*.

The magnetic core 1 is fixed by a fastening unit 13 made of a metallic material and laid across the holder 4, as illustrated in FIGS. 1 and 2. Specifically, the fastening unit 13 has an approximately U-shaped cross section, and both of its distal ends are bent into an approximately L shape, face each other so as to be able to engage with the holder 4, and form terminal sections 14*a* and 14*b*. The terminal sections 14*a* and 14*b* are arranged in positions opposed to a mounting substrate (not illustrated) and can be bonded to the mounting substrate by soldering or the like. Therefore, it is not necessary to provide a dummy electrode or the like on the back side of the holder 4, the bonding strength between the common-mode choke coil and the mounting substrate can be enhanced, and the common-mode choke coil with satisfactory mounting strength is obtainable.

In that case, the fastening unit 13 can be made of any metallic material and may preferably be made of a known material having satisfactory wettability, such as nickel silver, which is a copper-zinc-nickel alloy. If other general metallic material is used, at least the terminal sections 14*a* and 14*b* may preferably be coated with plating using tin, a tin alloy, or the like. That plating leads to satisfactory solderability even when reflow heating is performed, and desired satisfactory mounting strength is obtainable.

The fastening unit 13 may preferably be subjected to processing for springiness. When the fastening unit 13 has the springiness, the distance between the terminal sections 14*a* and 14*b* in the fastening unit 13 can be slightly narrowed, and upon attaching the fastening unit 13 from above the holder 4, the fastening unit 13 can firmly fix the magnetic core 1 by its elastic urging force.

Figure 5:
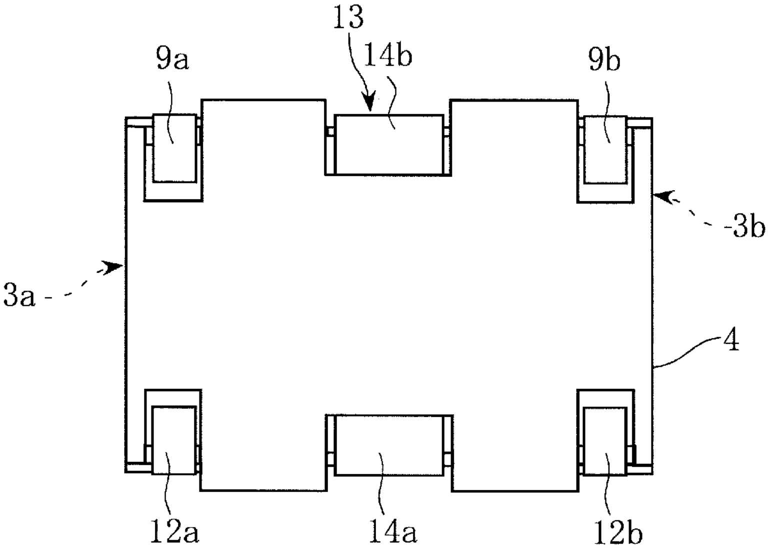
FIG. 5 is a bottom view of FIG. 2.

FIG. 5 is a bottom view of the common-mode choke coil and illustrates a relation of the extended sections in the coil conductors, the terminal sections in the fastening unit, and the holder.

In the first embodiment, the holder 4 is arranged in a position opposed to the mounting substrate (not illustrated), the terminal sections 14*a* and 14*b* in the fastening unit 13 are secured in a substantially central area of the holder 4, and the extended sections 9*a*, 9*b*, 12*a*, and 12*b* in the first and second coil conductors 3*a* and 3*b* are secured in the vicinities of both ends of the holder 4.

Next, the holder 4 is described in detail with reference to FIGS. 6 to 9.

Figure 6:
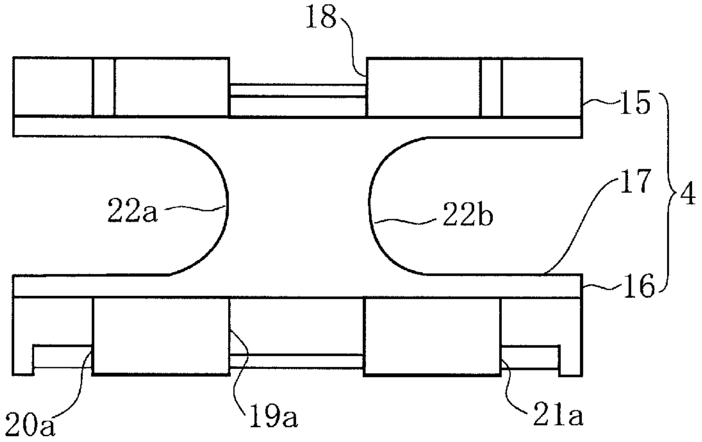
FIG. 6 is a front view of a holder according to the first embodiment.
Figure 7:
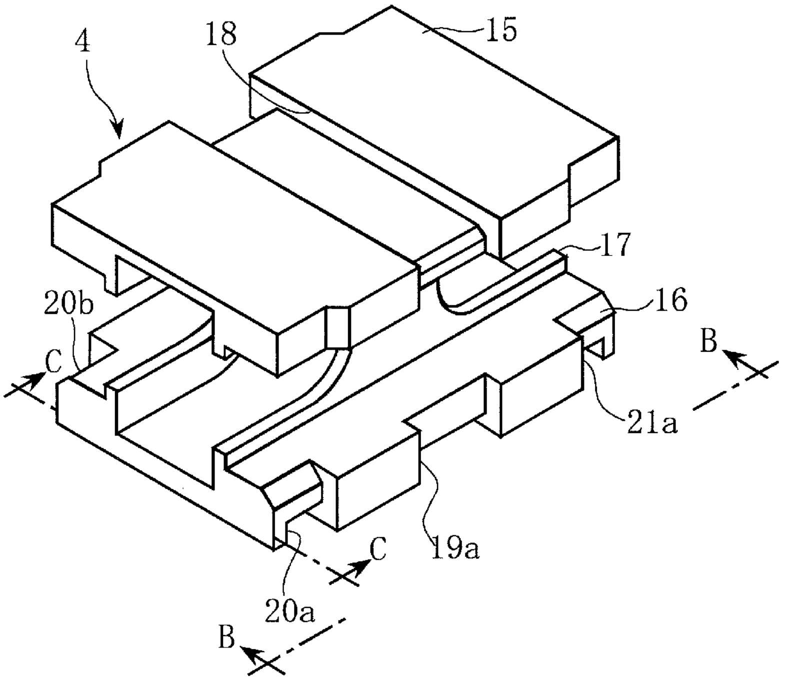
FIG. 7 is a perspective view of the holder.
Figure 8:
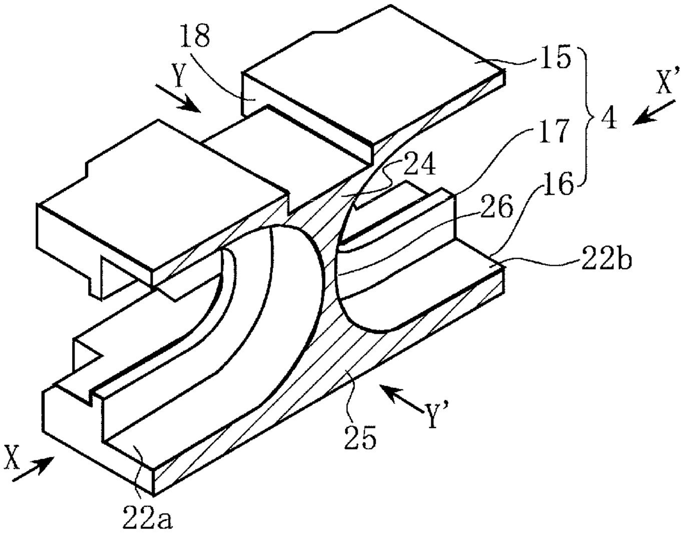
FIG. 8 is a perspective view in the direction of the arrows B in FIG. 7.
Figure 9:
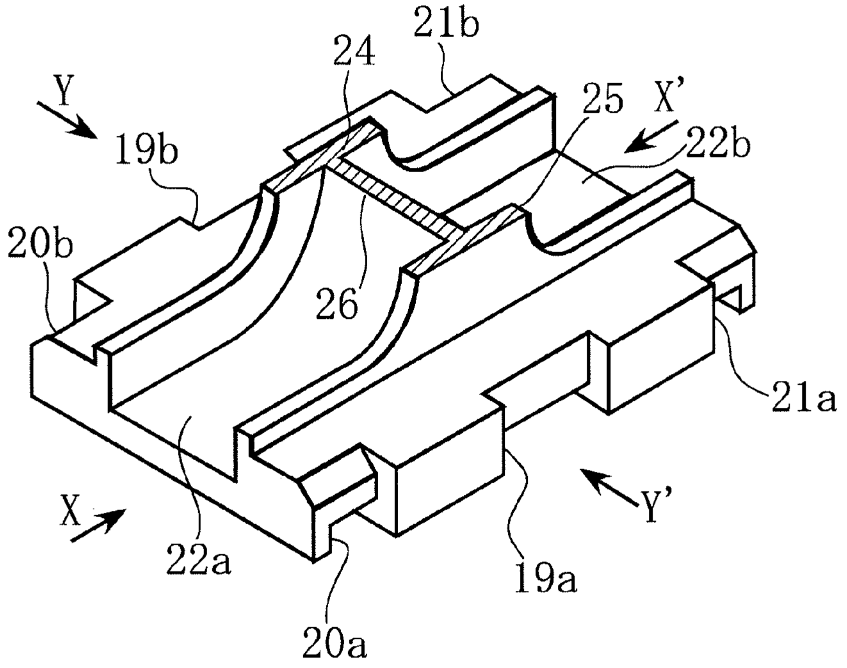
FIG. 9 is a perspective view in the direction of the arrows C in FIG. 7.

FIG. 6 is a front view of the holder 4. FIG. 7 is an overall perspective view of the holder 4. FIG. 8 is a perspective view in the direction of the arrows B in FIG. 7. FIG. 9 is a perspective view in the direction of the arrows C in FIG. 7.

The holder 4 includes an upper surface section 15 and a lower surface section 16, both of which have a flat shape, and an intermediate section 17 disposed between the upper surface section 15 and the lower surface section 16 and on which the first and second coil conductors 3*a* and 3*b* and the magnetic core 1 are arranged. The upper surface section 15, the lower surface section 16, and the intermediate section 17 are made of an insulating material, such as insulating resin, and are integrally formed by shape processing, such as injection molding or transfer molding.

The upper surface section 15 has a slot section 18 for use in fitting and attaching the fastening unit 13 thereto in a substantially central area in the surface. The slot section 18 is substantially parallel with the winding axes of the first and second coil conductors 3*a* and 3*b*.

The lower surface section 16 has a pair of first depressions 19*a* and 19*b* for engaging with the terminal sections 14*a* and 14*b* in the fastening unit 13 in side positions opposed to the slot section 18. The lower surface section 16 also has a pair of second depressions 20*a* and 20*b* and a pair of third depressions 21*a* and 21*b* for engaging with the extended sections 12*a* and 9*a* in the first coil conductor 3*a* and the extended sections 12*b* and 9*b* in the second coil conductor 3*b*, respectively, in side positions in the vicinities of both end portions.

As illustrated in FIGS. 8 and 9, the intermediate section 17 has a pair of cavities 22*a* and 22*b* having a substantially U-shaped cross section, allowing insertion of the first and second coil conductors 3*a* and 3*b* from directions with arrows X and X' and insertion of the first and second magnetic cores 1*a* and 1*b* from directions with arrows Y and Y', and enabling electrical insulation between the first and second coil conductors 3*a* and 3*b*. Therefore, the first partition 24 is disposed between the magnetic core 1 (first magnetic core 1*a*) and the first winding wire ends 7*a* and 7*b* of the first and second coil conductors 3*a* and 3*b*, the second partition 25 is disposed between the magnetic core 1 (second magnetic core 1*b*) and the second winding wire ends 10*a* and 10*b* of the first and second coil conductors 3*a* and 3*b*, and moreover, the third partition 26 is disposed between the first coil conductor 3*a* and the second coil conductor 3*b*. That is, the first to third partitions 24 to 26 are integrally formed so as to have a substantially I-shaped cross section.

Figure 10:
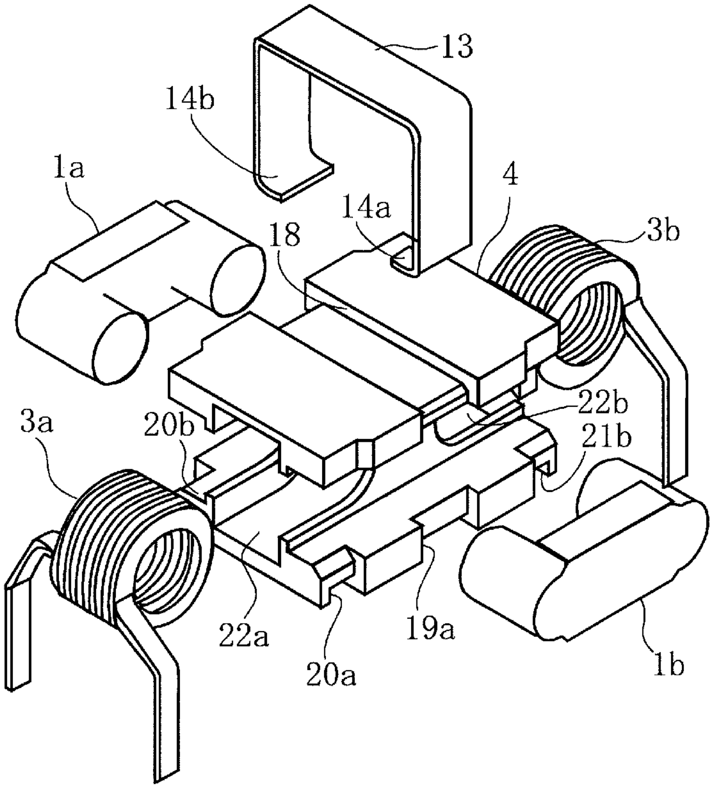
FIG. 10 is a perspective view for describing an assembly process in the first embodiment.

FIG. 10 is a perspective view that illustrates a process for assembling the common-mode choke coil.

First, the first and second coil conductors 3*a* and 3*b* are inserted into the cavities 22*a* and 22*b* in the holder 4, the end portions of the first and second coil conductors 3*a* and 3*b* are bent into an approximately L shape and form the extended sections 12*a*, 9*a*, 12*b*, and 9*b*, and the extended sections 12*a*, 9*a*, 12*b*, and 9*b* are secured to the second and third depressions 20*a*, 20*b*, 21*a*, and 21*b* in the holder 4 (lower surface section 16). Then, the first magnetic core 1*a* and the second magnetic core 1*b* are inserted into the cylindrical spaces of the first and second coil conductors 3*a* and 3*b*, the first magnetic core 1*a* and the second magnetic core 1*b* are coupled together, and the frame-shaped magnetic core 1 is produced. After that, the fastening unit 13 is fit and attached to the slot section 18 in the holder 4 (upper surface section 15), and the terminal sections 14*a* and 14*b* are secured to the first depressions 19*a* and 19*b* in the holder 4 (lower surface section 16). In that way, the common-mode choke coil is assembled.

In the common-mode choke coil having the above-described configuration, the magnetic core 1, in which the first magnetic core 1*a* and the second magnetic core 1*b* are coupled, forms a closed magnetic circuit. When a normal-mode current flows through the first and second coil conductors 3*a* and 3*b*, magnetic fluxes occur in the first and second coil conductors 3*a* and 3*b* in mutually opposite directions, the magnetic fluxes are canceled out, and they do not serve the function as an inductor. In contrast, when a common-mode current flows through the first and second coil conductors 3*a* and 3*b*, magnetic fluxes occur in the first and second coil conductors 3*a* and 3*b* in the same direction, and they function as the inductor. That is, they does not function as the inductor and a signal component is transmitted in the normal mode, whereas they function as the inductor and a noise component is transmitted in the common mode. Therefore, signals and noises can be separated by the use of the above-described difference in the transmission modes, and the noises can be reduced.

In the first embodiment, the holder 4 includes the first partition 24 disposed between the first magnetic core 1*a* included in the magnetic core 1 and the first winding wire ends 7*a* and 7*b* of the first and second coil conductors 3*a* and 3*b*, the second partition 25 disposed between the second magnetic core 1*b* included in the magnetic core 1 and the second winding wire ends 10*a* and 10*b* of the first and second coil conductors 3*a* and 3*b*, and the third partition 26 disposed between the first coil conductor 3*a* and the second coil conductor 3*b*, and the first partition 24, the second partition 25, and the third partition 26 are integrally formed by shape processing, such as injection molding. Therefore, there are no gaps between the first to third partitions 24 to 26, and accordingly, sufficient electrical insulation is provided between the magnetic core 1 and each of the first and second coil conductors 3*a* and 3*b* and between the first coil conductor 3*a* and the second coil conductor 3*b*, the insulation can be stabilized, and the coil component with satisfactory withstand voltage performance is obtainable.

In addition, because the fastening unit 13 includes the terminal sections 14*a* and 14*b* and may preferably be made of a known material having satisfactory wettability, such as nickel silver, or the terminal sections 14*a* and 14*b* may preferably be coated with plating, the terminal sections 14*a* and 14*b* are fixed directly to a mounting substrate with soldering or the like interposed therebetween, the adhesion strength between the mounting substrate and the common-mode choke coil can be easily enhanced, and the common-mode choke coil with satisfactory substrate mountability is obtainable.

Moreover, because the wire 2 is a coated rectangular wire, the space factor can be increased, and the rated current can be raised, in comparison with the case where a coated round wire is used. Thus, the high-performance coil component is obtainable.

Second Embodiment

Figure 11:
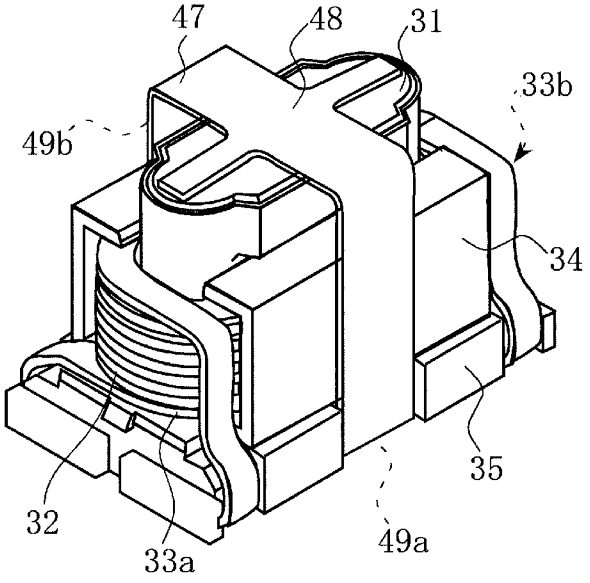
FIG. 11 is an overall perspective view that schematically illustrates a second embodiment of the common-mode choke coil as the coil component according to the present disclosure.
Figure 12:
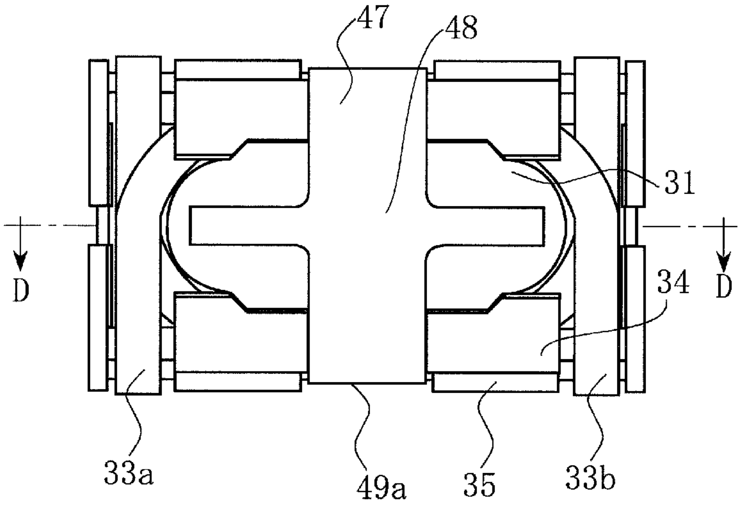
FIG. 12 is a plan view of the second embodiment.

FIG. 11 is an overall perspective view that illustrates a second embodiment of the common-mode choke coil as the coil component according to the present disclosure, and FIG. 12 is a plan view thereof.

In the first embodiment, the common-mode choke coil of the transversely wound type is illustrated. In the second embodiment, the common-mode choke coil of the longitudinally wound type is illustrated.

That is, the common-mode choke coil according to the second embodiment includes a frame-shaped magnetic core 31 made of a ferrite material, a first coil conductor 33*a* and a second coil conductor 33*b* in which a wire 32 is cylindrically wound, and a holder 34 made of an insulating material and surrounding and holding the first and second coil conductors 33*a* and 33*b* and the magnetic core 31, approximately like the first embodiment. In the second embodiment, the magnetic core 31 is arranged in a direction substantially perpendicular to a horizontal plane, the magnetic core 31 extends through the first and second coil conductors 33*a* and 33*b*, the winding axes of the first and second coil conductors 33*a* and 33*b* are substantially perpendicular to the horizontal plane, and the holder 34 is placed on a support 35.

Figure 13:
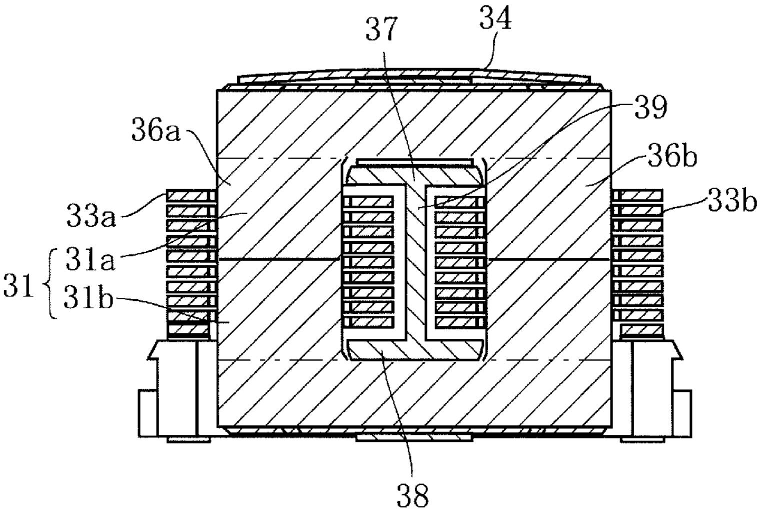
FIG. 13 is a cross-sectional view in the direction of the arrows D in FIG. 12.

FIG. 13 is a cross-sectional view in the direction of the arrows D in FIG. 12.

The magnetic core 31 is separated into a first magnetic core 31*a* and a second magnetic core 31*b*, approximately like the first embodiment. The first magnetic core 31*a* and the second magnetic core 31*b* are coupled together and form the frame-shaped magnetic core 31.

Specifically, the magnetic core 31 includes a first wound section 36*a* and a second wound section 36*b* facing each other and extends through the first and second coil conductors 33*a* and 33*b* such that the first coil conductor 33*a* and the first wound section 36*a* are associated with each other and the second coil conductor 33*b* and the second wound section 36*b* are associated with each other.

The holder 34 includes first to third partitions 37 to 39, and the first to third partitions 37 to 39 are integrally formed. Therefore, sufficient electrical insulation is provided between the magnetic core 31 and the first and second coil conductors 33*a* and 33*b*, and desired withstand voltage performance is ensured. Specifically, approximately like in the first embodiment, the first to third partitions 37 to 39 are integrally formed by shape processing, such as injection molding, so as to have a substantially I-shaped cross section at the time of producing the holder 34. That is, the first partition 37 is disposed between the first magnetic core 31*a* and the first and second coil conductors 33*a* and 33*b*, the second partition 38 is disposed between the second magnetic core 31*b* and the first and second coil conductors 33*a* and 33*b*, and the third partition 39 is disposed between the first coil conductor 33*a* and the second coil conductor 33*b*.

Figure 14:
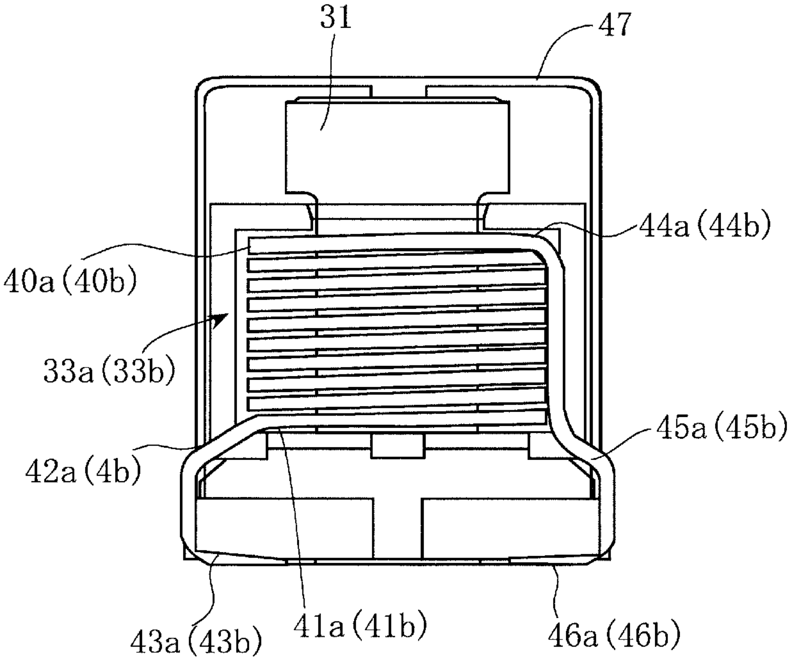
FIG. 14 is a side view of FIG. 12.

FIG. 14 is a side view of the common-mode choke coil and illustrates the details of the coil conductors.

The first coil conductor 33*a* and the second coil conductor 33*b* have the same shape, like in the first embodiment, and include winding sections 40*a* and 40*b* in which the wire 32 being a coated rectangular wire is cylindrically wound. In the first and second coil conductors 33*a* and 33*b*, the winding sections 40*a* and 40*b* include first winding wire ends 41*a* and 41*b*, their distal ends are curved and form inclined sections 42*a* and 42*b*, and distal ends of the inclined sections 42*a* and 42*b* are bent toward the winding sections 40*a* and 40*b* into an approximately L shape so as to be able to engage with the support 35 and form first extended sections 43*a* and 43*b*. The winding sections 40*a* and 40*b* include second winding wire ends 44*a* and 44*b* extending downward, their distal ends are curved into an approximately V shape and form inclined sections 45*a* and 45*b*, and distal ends of the inclined sections 45*a* and 45*b* are bent into an approximately L shape toward the winding sections 40*a* and 40*b*, that is, in positions facing the first extended sections 43*a* and 43*b* so as to be able to engage with the support 35 and form second extended sections 46*a* and 46*b*.

The magnetic core 31 and the holder 34 are fixed by a fastening unit 47 made of a metallic material. Specifically, as illustrated in FIGS. 11 and 12, the fastening unit 47 has an approximately square U-shaped cross section and includes a cross-shaped flat section 48 in contact with the magnetic core 31, and both of its distal ends are bent into an approximately L shape and face each other so as to be able to engage with the support 35 grasped by the holder 34. Thus, the distal ends of the fastening unit 47 form terminal sections 49*a* and 49*b* and, like in the first embodiment, the common-mode choke coil can be easily mounted on the mounting substrate (not illustrated) with soldering or the like interposed therebetween.

Figure 15:
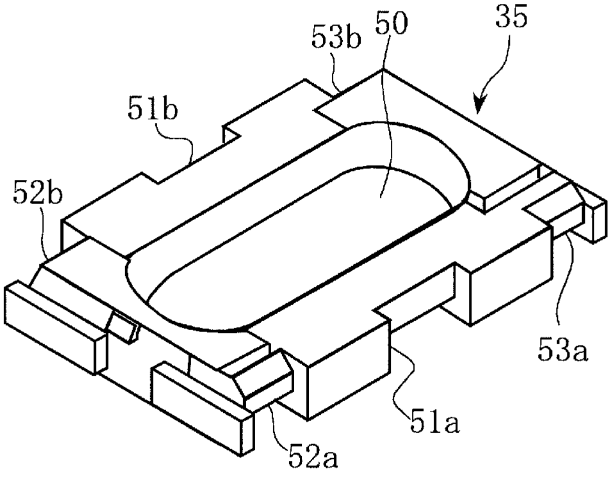
FIG. 15 is a perspective view of a support.

FIG. 15 is a perspective view that illustrates an example of the above-described support.

That is, the support 35 is made from a flat plate and has a substantially oval hole 50 for allowing the magnetic core 31 to extend therethrough. The support 35 includes a pair of first support depressions 51*a* and 51*b* grasped by the holder 34 and engaging with the terminal sections 49*a* and 49*b* in the fastening unit 47 in substantially central areas of its sides. The support 35 also includes a pair of second support depressions 52*a* and 52*b* and a pair of third support depressions 53*a* and 53*b* for engaging with the extended sections 46*a* and 43*a* in the first coil conductor 33*a* and the extended sections 46*b* and 43*b* in the second coil conductor 33*b*, respectively, in the vicinities of both end portions.

Figure 16:
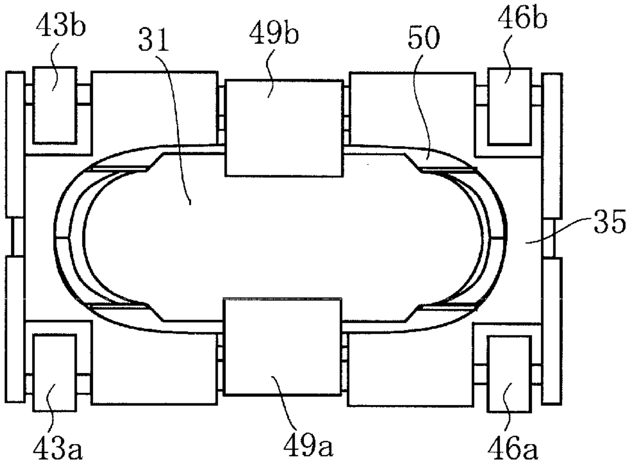
FIG. 16 is a bottom view of FIG. 12.

FIG. 16 is a bottom view of the common-mode choke coil and illustrates a relation of the support, the magnetic core, the extended sections in the coil conductors, and the terminal sections in the fastening unit.

The support 35 opposed to the mounting substrate (not illustrated) has the substantially oval hole 50 for allowing the magnetic core 31 to be exposed, as previously described, the terminal sections 49*a* and 49*b* in the fastening unit 47 are secured in the substantially central areas, and the extended sections 43*a* and 46*a* in the first coil conductor 33*a* and the extended sections 43*b* and 46*b* in the second coil conductor 33*b* are secured in the vicinities of both ends.

Next, the holder 34 is described in detail with reference to FIGS. 17 to 19.

Figure 17:
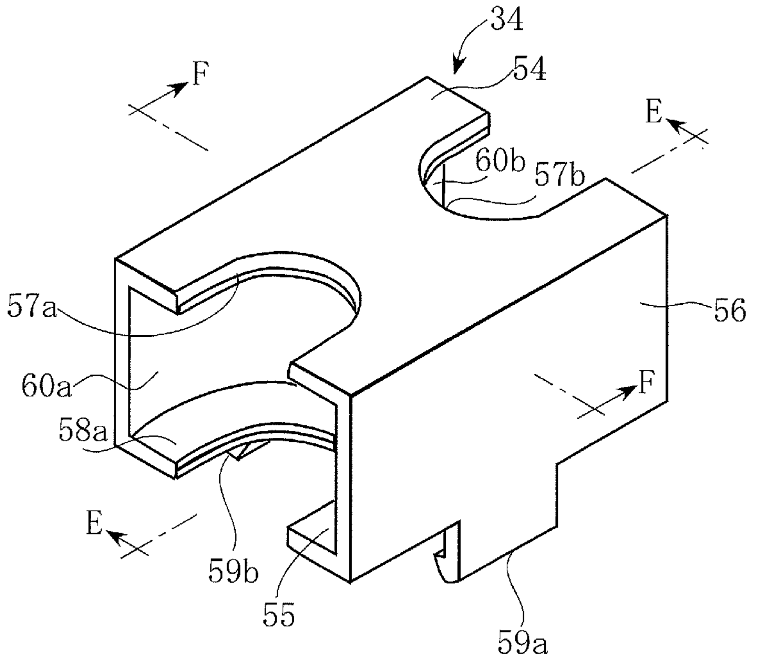
FIG. 17 is an overall perspective view of a holder according to the second embodiment.

FIG. 17 is an overall perspective view of the holder 34. FIG. 18 is a perspective view in the direction of the arrows E in FIG. 17. FIG. 19 is a perspective view in the direction of the arrows F in FIG. 17.

The holder 34 includes an upper surface section 54 and a lower surface section 55, both of which have a flat shape, and an intermediate section 56 connecting the upper surface section 54 and the lower surface section 55. Like in the first embodiment, the upper surface section 54, the lower surface section 55, and the intermediate section 56 are integrally formed by shape processing, such as injection molding or transfer molding.

The upper surface section 54 has a pair of upper U-shaped depressions 57*a* and 57*b* having a substantially U shape in both end portions so as to allow the magnetic core 31 to extend therethrough.

The lower surface section 55 has a flat shape, like the upper surface section 54, and includes lower U-shaped depressions 58*a* and 58*b* having a substantially U shape and facing the upper U-shaped depressions 57*a* and 57*b*. The lower surface section 55 includes projections 59*a* and 59*b* having a substantially L-shaped cross section and used for grasping the support 35 in substantially central areas thereof.

Figure 18:
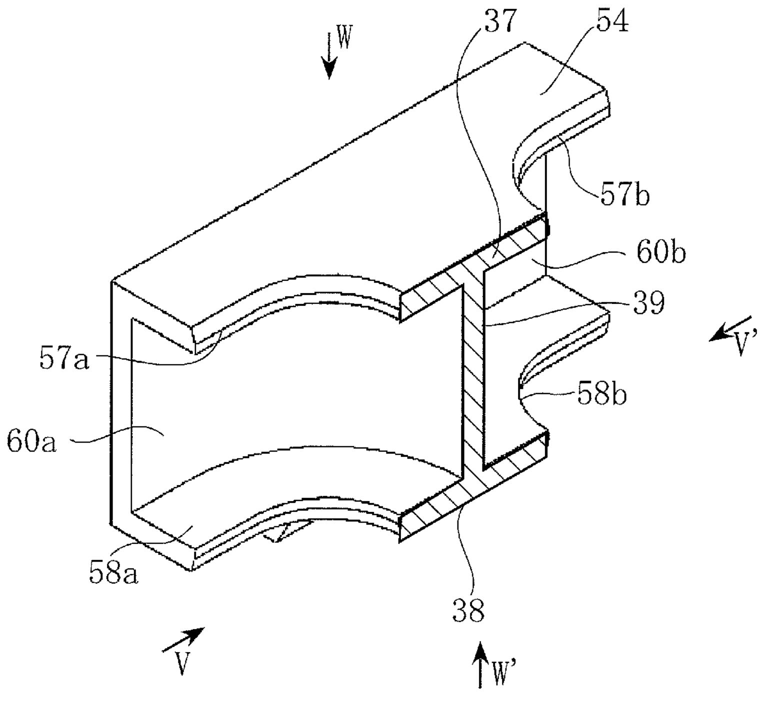
FIG. 18 is a perspective view in the direction of the arrows E in FIG. 16.
Figure 19:
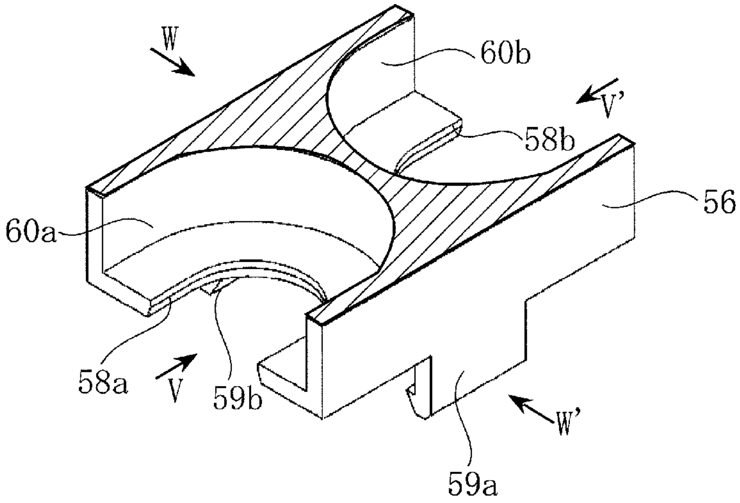
FIG. 19 is a perspective view in the direction of the arrows F in FIG. 16.

As illustrated in FIGS. 18 and 19, the intermediate section 56 has a pair of U-shaped cavities 60*a* and 60*b* having a substantially U shape, allowing insertion of the first and second coil conductors 33*a* and 33*b* from directions with arrows V and V' and insertion of the first and second magnetic cores 31*a* and 31*b* from directions with arrows W and W', and continuous with the upper U-shaped depressions 57*a* and 57*b* and the lower U-shaped depressions 58*a* and 58*b* so as to enable electrical insulation between the first and second coil conductors 33*a* and 33*b*.

Therefore, the first partition 37 is disposed between the magnetic core 31 (first magnetic core 31*a*) and the first winding wire ends 41*a* and 41*b* of the first and second coil conductors 33*a* and 33*b*, the second partition 38 is disposed between the magnetic core 31 (second magnetic core 31*b*) and the second winding wire ends 44*a* and 44*b* of the first and second coil conductors 33*a* and 33*b*, and, moreover, the third partition 39 is disposed between the first coil conductor 33*a* and the second coil conductor 33*b*.

Figure 20:
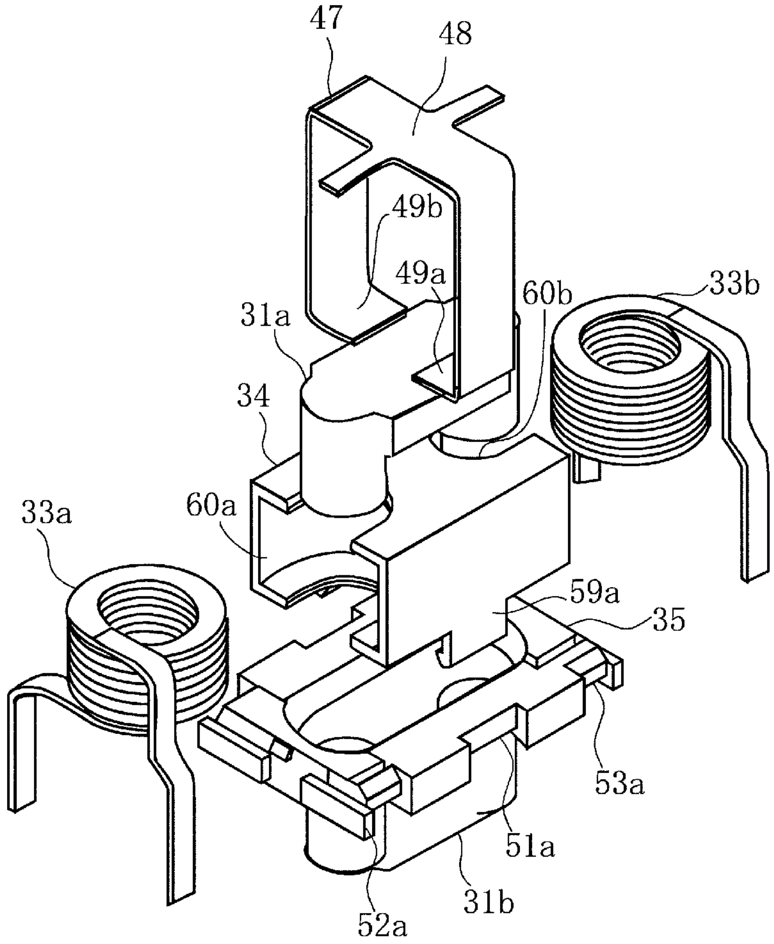
FIG. 20 is a perspective view for describing an assembly process in the second embodiment.
Figure 21:
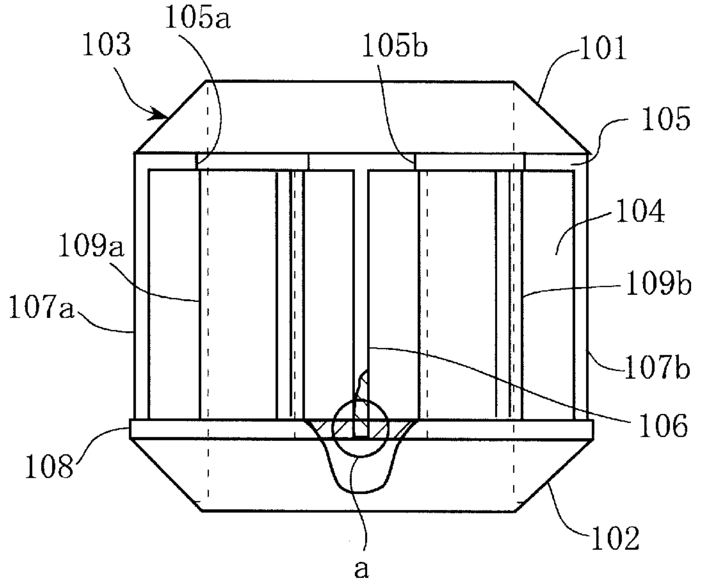
FIG. 21 is a cutaway front view of a coil casing described in Japanese Unexamined Patent Application Publication No. 2009-123825.
Figure 22:
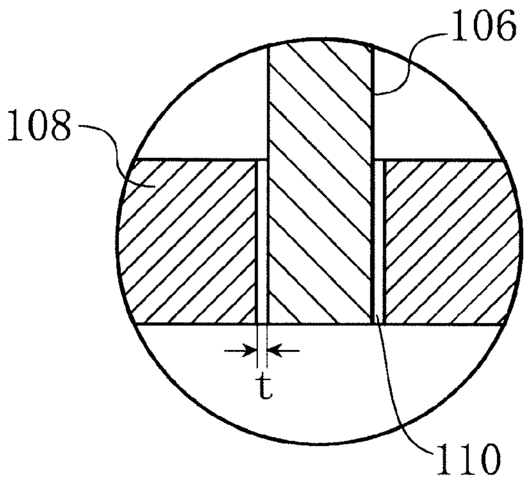
FIG. 22 is an enlarged cross-sectional view of FIG. 21.

FIG. 20 is a perspective view that illustrates a process for assembling the common-mode choke coil.

That is, the projections 59*a* and 59*b* in the holder 34 are secured to the first support depressions 51*a* and 51*b* in the support 35, thus the support 35 is grasped by the holder 34, and the holder 34 is placed on the support 35. Then, the first and second coil conductors 33*a* and 33*b* are inserted into the U-shaped cavities 60*a* and 60*b* in the holder 34, and the extended sections 43*a* and 46*a* in the first coil conductor 33*a* and the extended sections 43*b* and 46*b* in the second coil conductor 33*b* are secured to the second support depressions 52*b* and 52*a* and the third support depressions 53*b* and 53*a* in the support 35. Then, the first magnetic core 31*a* and the second magnetic core 31*b* are inserted into the cylindrical spaces of the first and second coil conductors 33*a* and 33*b*, and both are coupled together. After that, the fastening unit 47 is attached such that the cross-shaped flat section 48 is positioned on the surface of the magnetic core 31, and the terminal sections 49*a* and 49*b* in the fastening unit 47 are secured to the first support depressions 51*a* and 51*b* in the support 35. In that way, the common-mode choke coil can be assembled.

In the common-mode choke coil having the above-described configuration, like in the first embodiment, the holder 34 includes the first partition 37 disposed between the first magnetic core 31*a* and the first winding wire ends 41*a* and 41*b* of the first and second coil conductors 33*a* and 33*b*, the second partition 38 disposed between the second magnetic core 31*b* and the second winding wire ends 44*a* and 44*b* of the first and second coil conductors 33*a* and 33*b*, and the third partition 39 disposed between the first coil conductor 33*a* and the second coil conductor 33*b*. Because the first partition 37, the second partition 38, and the third partition 39 are integrally formed by shape processing, such as injection molding, there are no gaps between the first to third first partitions 37 to 39, like in the first embodiment. Accordingly, sufficient electrical insulation is provided between the magnetic core 31 and the first and second coil conductors 33*a* and 33*b* and between the first coil conductor 33*a* and the second coil conductor 33*b*, the insulation is stabilized, and the coil component with satisfactory withstand voltage performance is obtainable.

The present disclosure is not limited to the above-described embodiments, and they can be changed within a range that does not depart from the scope. That is, in the present disclosure, the above-described first to third partitions 24 to 26 and 37 to 39 are integrally formed, and the other shapes in the above-described embodiments are illustrated as examples. The processing performed as appropriate in the above-described embodiments exerts no effect on the present disclosure.

As for the plating on the fastening units 13 and 47, only the terminal sections 14*a*, 14*b*, 49*a*, and 49*b* are coated with the plating in the above-described embodiments. The fastening units 13 and 47 may be entirely coated with the plating.

Example application to the common-mode choke coil is described in the above-described embodiments. The present disclosure is also applicable to various types of coil components, other than the common-mode choke coil.

The small coil component that can ensure sufficient insulation and that has satisfactory withstand voltage performance is obtainable.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a frame-shaped magnetic core including wound sections facing each other;

a pair of coil conductors in which a wire is cylindrically wound, the magnetic core extending through the coil conductors such that the coil conductors and the wound sections are associated with each other; and a holder made of an insulating material and surrounding and holding the pair of coil conductors and the magnetic core, the holder including a first partition disposed between the magnetic core and a first winding wire end of each of the pair of the coil conductors, a second partition disposed between the magnetic core and a second winding wire end of each of the pair of the coil conductors, a third partition disposed between the pair of coil conductors, an upper flat surface that extends in a direction parallel to an axial direction of the coil conductors, and a lower flat surface that faces the upper flat surface on an opposite side of the coil conductors and extends in the direction parallel to the axial direction of the coil conductors, wherein wound sections of the coil conductors are covered on opposite sides in a direction orthogonal to the axial direction of the coil conductors by the upper flat surface and the lower flat surface, and the first partition, the second partition, the third partition, the upper flat surface, and the lower flat surface are integral with each other.

2. The coil component according to claim 1, wherein the magnetic core is separable into a first magnetic core and a second magnetic core, the first partition is disposed between the first magnetic core and the first winding wire end of each of the pair of the coil conductors, and the second partition is disposed between the second magnetic core and the second winding wire end of each of the pair of the coil conductors.

3. The coil component according to claim 2, wherein the wire is a rectangular wire.

4. The coil component according to claim 2, wherein the magnetic core is fixed by a fastening unit made of a metallic material.

5. The coil component according to claim 2, wherein the holder is on a support.

6. The coil component according to claim 2, wherein the magnetic core is made of a ferrite-based material.

7. The coil component according to claim 2, wherein the coil component is a common-mode choke coil.

8. The coil component according to claim 1, wherein the wire is a rectangular wire.

9. The coil component according to claim 8, wherein the magnetic core is fixed by a fastening unit made of a metallic material.

10. The coil component according to claim 8, wherein the holder is on a support.

11. The coil component according to claim 8, wherein the magnetic core is made of a ferrite-based material.

12. The coil component according to claim 1, wherein the magnetic core is fixed by a fastening unit made of a metallic material.

13. The coil component according to claim 12, wherein the fastening unit includes a terminal section, and the terminal section is opposed to a mounting substrate.

14. The coil component according to claim 13, wherein the terminal section is coated with plating.

15. The coil component according to claim 1, wherein an axis of each respective coil conductor extends along a horizontal plane.

16. The coil component according to claim 1, wherein the holder is on a support.

17. The coil component according to claim 1, wherein the magnetic core is made of a ferrite-based material.

18. The coil component according to claim 1, wherein the coil component is a common-mode choke coil.

19. The coil component according to claim 1, wherein the coil conductors are of a longitudinally wound type.

* * * * *